United States Patent Office 2,876,580
Patented Mar. 10, 1959

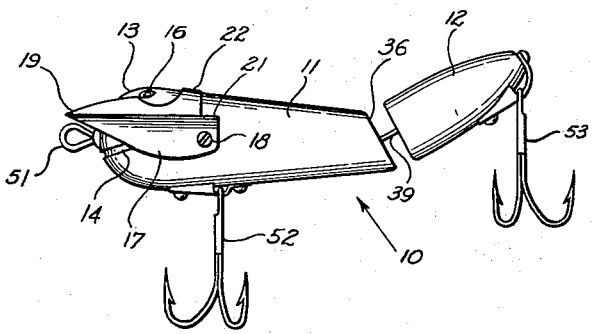
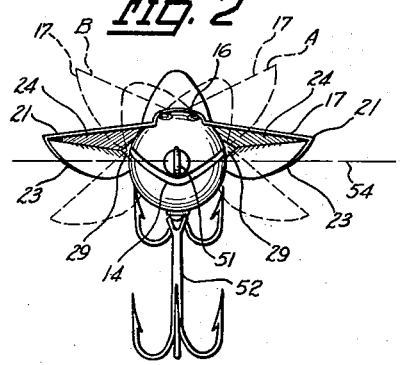
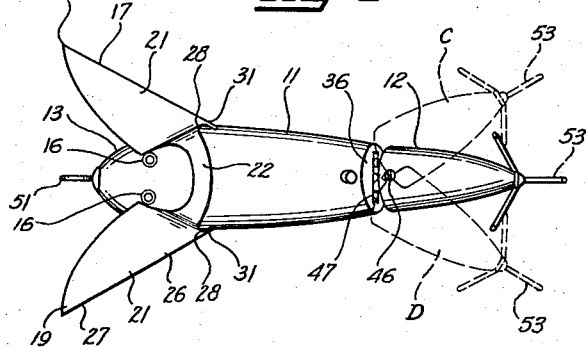
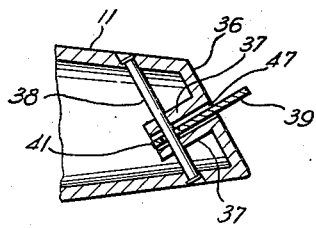
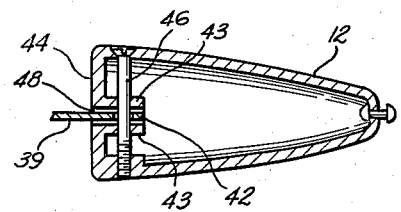

2,876,580

FISH LURE

George H. Schwartztrauber, West Des Moines, Iowa

Application January 25, 1955, Serial No. 483,885

3 Claims. (Cl. 43—42.06)

This invention relates generally to fish lures and more particularly to a fish lure of surface type which, by virtue of its movement when retrieved, attracts fish.

An object of this invention, therefore, is to provide an improved fish lure.

A further object of this invention is to provide a fish lure which has a pair of outwardly projected deflector or scoop members which operate during retrieving of the lure to impart reversed rolling and swinging movements to the lure.

Another object of this invention is to provide a fish lure which rolls from side to side concurrently creating a bubbling or gurgling effect on the water at opposite sides of the lure.

A further object of this invention is to provide a fish lure which includes a body and a tail section pivotally connected to the body for transverse oscillating movement during retrieving of the lure.

Still a further object of this invention is to provide a fish lure which is simple in construction, economical to manufacture, and efficient in operation to attract fish.

Further objects, features and advantages of this invention will become apparent from a consideration of the following description when taken in connection with the accompanying drawing in which:

Fig. 1 is a side elevational view of the fish lure of this invention;

Fig. 2 is a front end view of the fish lure of this invention, and showing moved positions of the lure in dotted lines;

Fig. 3 is a top plan view of the lure of this invention, showing extreme moved positions of the lure tail section in dotted lines; and Figs. 4 and 5 are enlarged fragmentary sectional views of portions of the lure of this invention.

Wtih reference to the drawing, the lure of this invention, indicated generally at 10, is shown in Fig. 1 as including a body member 11 provided with a separate tail section 12. The body member 11 is of a plug shape to simulate a small fish, and has a head end 13 formed with a mouth 14 and provided with eyes 16 (Figs. 1, 2, and 3). A deflector or scoop unit 17 is secured to the body member 11, by means of a pair of screws 18 (only one of which is shown) located at a position rearwardly of the eyes 16.

The deflector unit 17, which is of a unitary or one-piece construction, is of a generally butterfly shape having a pair of wing deflectors or scoop members 21 arranged on opposite sides of the body member 11 and extended forwardly and outwardly from the body member 11, with each deflector 21 terminating in a front end or point 19. A connecting strap portion 22 extends between the deflector members 21 and is positioned on the top side of the body member 11. Each deflector member 21 is of a substantially L-shape in transverse section, having a flat substantially vertical leg section 23 and a flat substantially horizontal leg section 24, with the juncture 26 of the leg sections 23 and 24 for a member 21 being spaced from the body member 11 and extended forwardly and outwardly of the body member 11.

Each of the leg sections 23 and 24 is of a decreasing width in a direction toward the front end 19 thereof so that as the lure 10 is drawn through the water, the front pointed ends 19 of the deflector members 21 act to divert a portion of the water toward the body member 11 between the deflector members 21.

As best appears in Fig. 3, each deflector member 21 is formed with a cut out portion 28 adjacent the juncture thereof with the connecting strap portion 22. As a result, when the deflector unit 17 is assembled on the body member 11, a space or opening 29 (Fig. 2) is formed at the rear end 31 of each deflector member 21, between the body member 11 and the deflector member 21. These openings 29 function as water relief openings for the water trapped between the deflector members 21 and the body member 11 as will be more fully explained hereinafter.

The body member 11 and tail section 12 are preferably formed of a plastic material such as tenite and are hollow to provide for a floating of the lure 10 so that the lure functions as a surface lure. As best appears in Fig. 4, the rear wall 36 of the body member 11 is inclined downwardly and rearwardly relative to the axis of the body member 11 and is formed with a transverse slot 47. A pair of inwardly directed bearing supports 37 on the end wall 36 are arranged in a parallel spaced relation on opposite sides of the slot 47 and extend forwardly in a substantially perpendicular relation with the wall 36. A pin 38 extended laterally through the body member 11 and the supports 37, is also extended through the front end 39 of a flat metal link 41 positioned between the supports 37. The opposite end 42 of the link 39 extends through a slot 48 in the front end 44 of the tail section 12 and is positioned between a pair of bearing supports 43, similar to the supports 37, extended rearwardly from the front end wall 44 of the tail section 12 on opposite sides of the slot 48. A screw 46 extended through the end 42 of the link 39 and the supports 43, releasably pivotally connects the link 39 with the tail section 12.

It is seen, therefore, that the link 39 provides for a pivotal support of the tail section 12 on the body member 11, with the tail section 12 inclined upwardly and rearwardly relative to the body member 11. As a result, the tail section 12 is pivotally movable relative to the body member 11 in a direction generally transversely of the body member 11 with the engagement of the link 39 with the body member 11 and tail section 12 at the ends of the slots 47 and 48, respectively, limiting this transverse pivotal movement.

The usual eye screw 51 is provided at the head end 13 of the body member 11 for attaching a leader to the body member 11. Also, a hook 52 is secured to the underside of the body member 11 intermediate the ends thereof, and a similar hook 53 is secured to the rear end of the tail section 12.

In use, the lure 10 floats in the water by virtue of its hollow construction, so that when the lure is being retrieved, the head end 13 of the lure is about half in the water, as shown in Fig. 2 wherein the water level is indicated at 54. As the lure 10 is retrieved, the body member 11 rolls from side to side in the water as shown diagrammatically in Fig. 2. In other words, the body member 11 rolls back and forth between the dotted line positions shown for the deflector unit 17 in Fig. 2, with the lure first rolling to the position indicated at A in which one of the deflector members 21 is above the water level 54 and next rolling in a reverse direction so that the deflector unit 17 is in the position indicated at B in which the opposite deflector member 21 is above the water level 54.

In addition to rolling back and forth, the body member swings in a transverse direction about its head end 13 as a result of the alternate action of the water on the deflector members 21. In other words, when one of the deflector members 21 is out of the water the action of the water on the opposite deflector 21 swings the body member 11 transversely relative to the direction in which the body member is being retrieved. Thus, with the deflector members 21 being alternately moved into and out of the water, the action of the water on the deflectors 21 also swings the body member 11 from side to side. The swinging of the body member 11, causes the tail section 12 to pivot or swing back and forth between the extreme pivoted positions for the tail section 12 indicated at C and D in Fig. 3. Further, each time a deflector member 21 is moved to a position above the water level 54, the water trapped between the body member 11 and the deflector 21 gurgles or bubbles through the water relief opening 29 at the rear end of the deflector member 21 so as to leave a trail of bubbles. This action of the water moving through the water relief openings 29 further disturbs the water in addition to making a bubbling or gurgling sound.

As a result, the lifelike appearance of the body member 11, the rolling of the lure 10 from side to side so that opposite sides of the lure 10 are alternately exposed above the water, the gurgling of the water through the water relief spacers 29 and the transverse swinging of the body member 11 and the tail section 12 cooperate to provide an action which attracts fish to the lure 10. In overall appearance, the lure 10 appears to be attempting to crawl the leader as the lure is being retrieved.

By virtue of the releasable connection of the tail section 12 to the link 39, the tail section 12 is removable from the link 39 on removal of the screw 46. If desired, therefore, the tail section 12 may be replaced by a pork rind, spinner, or the like whichever may be desired at a particular fishing location.

From the above description, it is seen that this invention provides a fish lure 10 which produces the necessary action to attract fish as the lure is retrieved in the water. The provision of the deflector unit 17 and its arrangement on the body member 11 intermediate the ends thereof provides for this action, as does the pivotally mounted tail section 12.

Although the invention has been described with respect to a preferred embodiment thereof, it is to be understood that it is not to be so limited, since changes can be made therein which are within the full intended scope of this invention as defined by the appended claims.

I claim:

1. A fish lure comprising a body member having a head portion, a one-piece deflector unit mounted on said body member adjacent said head portion, said unit including a pair of L-shaped sections having leg portions extended angularly to each other, said sections projected forwardly and outwardly relative to said head portion, and with the rear ends of the leg portions of each of said sections contacting said body member and having the junction therebetween spaced from said body to provide for a flow of water along said head portion and between said sections and said body member during forward movement of said body member through the water.

2. A fish lure comprising a body member having a front head portion, a pair of deflector members mounted on said body member on transversely opposite sides thereof at positions rearwardly of said head portion, with each deflector member being of a plate construction and having angularly related first and second portions, said first portion being extended substantially transversely of said body member in a direction outwardly and forwardly thereof, said second portion being extended downwardly from said first portion at a position spaced outwardly of said body member, whereby said deflector members function during forward travel of the body member in water to move water toward said body member, and means adjacent rear portions of said deflector members forming water relief openings to provide for the rearward passages of the water deflected by said deflector members.

3. A fish lure comprising a plug shape floatable body member having deflector members projected outwardly from transversely opposite sides thereof at positions intermediate the ends thereof, with each deflector member being inclined relative to said body member and including angularly related portions each of which contacts said body member, the junction of said portions spaced from said body member whereby to form a water relief opening at said junction, and means on said body member for securing a hook thereto.

References Cited in the file of this patent

UNITED STATES PATENTS

| | | |
|---|---|---|
| 1,084,517 | Wilson | Jan. 13, 1914 |
| 1,133,669 | Reynolds | Mar. 30, 1915 |
| 1,200,135 | Reynolds | Oct. 3, 1916 |
| 1,692,935 | Heddon | Nov. 27, 1928 |
| 1,870,559 | Drake | Aug. 9, 1932 |
| 2,003,550 | Muller | June 4, 1935 |
| 2,235,597 | Winter | Mar. 18, 1941 |
| 2,496,231 | Phippen | Jan. 31, 1950 |
| 2,550,704 | Lizun | May 1, 1951 |
| 2,596,474 | Espey | May 13, 1952 |
| 2,606,388 | Croft et al. | Aug. 12, 1952 |